United States Patent [19]

Bechara et al.

[11] 4,400,476
[45] Aug. 23, 1983

[54] PAINT ADHESION FOR RIM PARTS

[75] Inventors: Ibrahim S. Bechara, Boothwyn; Rocco L. Mascioli, Media, both of Pa.

[73] Assignee: Air Products and Chemicals, Inc., Allentown, Pa.

[21] Appl. No.: 358,402

[22] Filed: Mar. 15, 1982

[51] Int. Cl.$^3$ .................... C08G 18/14; C08G 18/24; B29D 9/00
[52] U.S. Cl. .................................. 521/107; 521/108; 521/906; 264/45.5; 264/51; 264/DIG. 83; 528/51; 528/53; 528/58
[58] Field of Search .................... 521/108, 107, 906; 264/DIG. 83, 45.5; 528/53, 58, 51

[56] References Cited

U.S. PATENT DOCUMENTS 3,803,064  4/1974  Fishbein et al. .................... 521/107
4,273,885  6/1981  Dominguez et al. ............... 521/115

Primary Examiner—H. S. Cockeram
Attorney, Agent, or Firm—Michael Leach; E. Eugene Innis; James C. Simmons

[57] ABSTRACT

The addition of a small amount of a halogen compound, e.g. chloroethyl phosphate, in a process producing elastomeric polyurethane RIM parts using tertiary amines as the chief catalyst component results in scavenging the residual amines after the part has been cured by annealing. The parts from such a process can be coated with a wide variety of enamels having a high solids content and completely cured to result in a higher degree of adhesive between the coating and the part's surface than those parts from a process without the use of such a halogen.

6 Claims, No Drawings

PAINT ADHESION FOR RIM PARTS

TECHNICAL FIELD

The present invention relates to urethane formulations for use in production of products by reaction injection molding (RIM) and is particularly concerned with improving the adhesion of resinous coatings applied to such products.

BACKGROUND OF THE INVENTION

Formulations for production of reaction injection molded elastomer polyurethane products, such as those widely employed in the automotive industry, generally comprise a high molecular weight polyether polyol and an organic polyisocyanate together with volatile organic blowing agents and catalyts which may be tertiary amine, organo-tin compound, or more generally a co-catalyst combination of tertiary amine and tin catalysts. Triethylene diamine catalyst, more often together with a smaller amount of tin co-catalyst, have been widely used in polyurethane RIM formulations. In addition to the usual components common to formulations for blown polyurethane products, those employed in the formation of urethane elastomeric products by reaction injection molding, typically contain chain extenders, such as low molecular weight diols (e.g. ethylene glycol or butane diol) and diamine (such as diethyl toluenediamine). The obtained RIM polymers contain the chemical bond formation of urethane, urea and to a lesser extent allophonate and biuret, in which the polymer product comprises a build-up of hard and soft block segments having the desired physical properties. This segmentation is controlled by the selection of reactants as well as by the relative reaction rate between the polyol and isocyanate. The level of catalysts and the type thereof has an important influence on the reaction rates.

To obtain good processability of a RIM part, the reactants should remain fluid in the initial stages for good flowability into the mold, but be viscous enough to prevent excess wetting of the mold surface and avoid air entrapment. While this can be achieved to greater or less extent by tin catalysts alone or by ditertiary amine catalyst such as triethylenediamine, alone, the combination of these has been found beneficial because of the remarkable synergism displayed.

When acrylic or melamine-based coatings of very high solids content above a particular level are applied to RIM products, it was found that frequently a tacky or soft finish was had. This was observed particularly in those instances when the high solids coating was applied to products produced from a RIM formulation containing a relatively large amount of tertiary amine catalyst. Since the acrylic and melamine based coatings used are cured by acid, the resulting tacky finish was attributed to the presence of residual amine in the molded polyurethane product, which interfered with cross-linking reactions needed for complete cure of the coating polymer resin. In the case of RIM formulations containing less than 0.15 parts of triethylenediamine catalyst per hundred parts of polymer (php), no adverse effects were observed on the surfaces coated with the very high solids enamels. Complete cures with no loss in physicals were obtained. Also, it was found that the incomplete curing of such higher solids coatings did not occur when the RIM formulation comprised reactive hydroxyalkyl amine catalysts (with less than 0.15 php of non-reactive tertiary amine). In that instance, as the elastomer is cured the reactive amine apparently is chemically bound to the urethane polymer backbone, preventing the amine from interfering with cure of the coating.

In investigations leading to the present invention numerous approaches were considered and pursued to overcome the problem of incomplete cure of acid-catalyzed resin coatings of high solids content applied to molded urethane products such as those produced by the RIM procedure. It was found that the problem presented could be overcome and acceptable acid-catalyzed resin coatings of high solids content could be obtained on urethane surfaces containing volatile amines, by the inclusion of certain scavenger compounds in the RIM formulation.

SUMMARY OF THE INVENTION

In accordance with the present invention there is provided in the method of producing elastomeric polyurethane molded products comprising the steps of (a) injecting into a mold cavity a reactive mixture of a high molecular weight polyetherpolyol, an organic polyisocyanate, an organic blowing agent and a catalyst composition for the reaction in which a non-reactive tertiary amine constitutes the major catalyst component of the reaction mixture; (b) removing the obtained polyurethane product from the mold, and (c) applying to the molded product an acid-catalyzed resin-base coating; the improvement which comprises enhancing complete curing of the coating by inclusion in the reaction mixture of an organic halogen compound in an amount providing the equivalent of about 1 to 1.5 molar parts of reactive halogen per mole of available amino nitrogen in the catalyst component of the mixture.

The principle of the invention is particularly applicable to urethane formulations employed in making RIM products which are commonly given a surface coating with an acid-cured enamel of high solids content.

DETAILED DESCRIPTION OF THE INVENTION

Since only a small amount of the halogen compound is needed to accomplish the stated objective, its inclusion in the urethane formulation will not interfere with the production or quality of the desired urethane products.

The halogen compound employed needs to be one capable of eventually reacting with residual amines, but only after the molded part has been cured. In other words, the rate of reaction of the halogen compound with the amine should be substantially less than the rate of the polymerization reaction taking place in formation of the urethane by the catalyzed reaction of organic polyisocyanate and polyol.

Only a small amount of the halogen compound needs to be used for scavenging the residual amine as up to no more than about a molar equivalent of contained halogen in said compound per mole of amino nitrogen in the catalyst. Amounts of halogen in excess of about 3% by weight of polyol in the formulation may interfere with catalysis or otherwise impair the desired urethane reaction, unless compensating changes are made in the formulations conventionally employed.

Among the halogen compounds that may be employed for neutralizing the residual amine, there are a number of compounds readily available commercially, including "Fryol CEF" (chloroethyl phosphate), "Thermolin 101" (a chloroethyl phosphate dimer), chlorinated paraffins of high molecular weight such as chlorinated paraffin wax (e.g. "Chlorowax 50") and chlorinated polyols (e.g. Olin's RF-230). Certain of these listed compounds are employed as flame retardants; however, the amount that needs to be used in the urethane formulations of the present invention is far below the level required to impart significant flame retardant properties, their use above the level of about 3 parts by weight per hundred parts of polyol detract from the physical properties of the elastomers and thus such a level is undesirable as will be shown in the examples below.

Typical RIM formulations are illustrated below:

TABLE 1

|  | A | B |
|---|---|---|
| (1)Pluracol ® 380 | 80 | 100 |
| (2)Multranol ® 9151 | 20 | — |
| 1,4-butanediol | 23 | 23 |
| Fluorocarbon | 4 | 4 |
| Catalyst |  |  |
| Triethylenediamine and | 0.1–0.5 | 0.1–0.5 |
| Tin, Dibutyl Tin diLaureate | 0.02 | 0.02 |
| or |  |  |
| Dibutyl Tin diLaurate alone | 0.05–0.11 | 0.05–0.11 |
| (3)Mondur ® CD | 79.5 | 79.5 |

(1)High molecular weight (~6500) polyether polyol supplied by BASF Wyandotte.
(2)Polyurea dispersion in polyether polyol supplied by Mobay Chemical Co.
(3)Methylenediisocyanate containing carbodimide supplied by Mobay Chemical Co.

In general, RIM formulations may contain per hundred parts high molecular weight (above about 5000), polyol, 15 to 30 parts of butane diol or other low molecular weight diol, 0 to 4 parts of fluorocarbon or other organic blowing agent, and an amount of polyisocyanate providing 1 to 1.05 molar equivalents of NCO per 1 equivalent of active hydrogen-containing compounds.

In the typical RIM procedure, the reactive urethane-producing composition, such as that shown in column A or B of Table 1 or a similar RIM formulation is injected into the mold cavity in which the polyurethane product is formed. The product is removed from the mold and annealed. The surface is then washed with aqueous detergent, rinsed and dried to remove surface moisture. The top coat enamel is applied, generally over a previously applied dried primer coat, air dried and the coated product is baked. Among other possible causes of incomplete curing of the top coat is the presence of amine at the surface of the urethane product which inhibits the effectiveness of the acid catalysis of the coating. Such amines may be present from urethane formulations which contain amino-based polyols or amino chain-extenders. During heating of the polyurethane product amino nitrogen may be caused to orient toward the surface. Also during curing by heating, volatile amine from the tertiary amine catalyst may rise to the surface and can react with the acid.

Products obtained by reaction injection molding using the formulations of Table 1 or similar formulations have been successfully coated with acid-catalyzed enamels containing in the range of about 25% to about 35% solids (e.g. Durethane ®300 Elastomeric Enamel). Also such RIM products can be successfully coated with water-based enamels and with "color plus clear" coatings. As the solids content of acid-catalyzed, enamels are increased, (e.g. in range of about 35 to about 42%) however, to reduce the number of required spray positions and solvent emissions, these coatings become more sensitive to environmental factors. This is particularly evident with respect to obtaining complete curing of such high solids coatings applied to RIM products prepared from formulations containing in excess of about 0.15 php of tertiary amine catalyst. As will be seen from the following examples, this problem of incomplete cure is overcome when there is included in the RIM formulation a reactable halogen compound in accordance with the invention.

The reaction between the residual amine in the RIM product and the halogen compound is believed to result in tying up the amine, following catalysis of the urethane reaction, by the formation of a quaternary amine. Thus, for example in the use of tris (chloroethyl phosphate), the reaction can be illustrated as

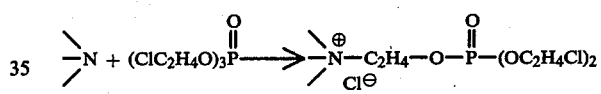

After the quaternary amine halide is formed the amine is no longer available to interfere with the acid in the coating.

EXAMPLE 1

Using the formulation 1A of Table 1 above, column A, urethane products were prepared by injection molding in the conventional manner, employing the amounts of catalyst indicated in Table 2, with and without added halogen compound as a scavenger. These products were each painted with a conventional melamine base automotive baked exterior enamel and subjected to the listed tests, with the results indicated in Table 2.

TABLE 2

| PROCESS | TEST | TEDA 0.5 php | T-12 00.9 php | TEDA 0.5 php CEF | | | TEDA 0.1 php DABCO ®T 0.5 php |
|---|---|---|---|---|---|---|---|
|  |  |  |  | 5.0 php | 2.5 php | 1.0 php |  |
| I | MEK | F | P | P | P | P | P |
| I | Humidity | P | P | P | P | P | P |
| I | Elongation % | 199–285 | 52–65 | 43–55 | 49–55 | 53–69 | 65–83 |
| II | MEK | F | P | P | P | P | P |
| II | Humidity | P | P | P | P | P | P |
| II | Elongation % | 194–251 | 53–70 | 36–50 | 58–60 | 51–57 | 59–89 |
| III | MEK | F | P | P | P | P | P |
| III | Humidity | P | P | P | P | P | P |

TABLE 2-continued

| | | TEDA 0.5 | T-12 00.9 | TEDA 0.5 php CEF | | | TEDA 0.1 php | |
| PROCESS | TEST | php | php | 5.0 php | 2.5 php | 1.0 php | DABCO®T 0.5 php |
|---|---|---|---|---|---|---|---|
| III | Elongation % | 214–233 | 54–83 | 50–57 | 46–52 | 65–76 | 59–74 |

Process I—Wash in aqueous solution comprising Ridoline 72 (Amchem) a powdered, nonsilicated, alkaline detergent containing biodegradable organic surfactants; followed by water rinse.
Process II—Wash in mildly acidic detergent composition comprising Ridoline 804 (Amchem); followed by water rinse.
Process III—Wash in 10% aqueous solution of P—toluene sulfonic acid followed by water rinse.
php = per hundred parts by weight of polyol
F = failed;
P = passed.
DABCO T is trimethylaminoethyl ethanolamine.
CEF is tris(chloroethyl) phosphate.
MEK is methyl ethyl ketone.

Before subjecting the enamel coated RIM specimen part to the several tests indicated in Table 2, the part was washed by each of the indicated procedures before being subjected to the tests.

In the standard MEK test, the part is rubbed lightly in a 1-inch circle about 10 times with a cloth wet with MEK, then blow-dried. The dried surface is scratched vigorously with the fingernail. If no film is thereby removed, the cure of the enamel is deemed sufficient and the test is passed. If some film is removed, the cure is not sufficient and the specimen has failed the test. In addition, for a mark of P (passed) the gloss on the surface should be unaffected after ½ hour air drying.

In the elongation test the enameled RIM specimen is cut into sample pieces, which are subjected to a pulling force at 2 inches per minute at room temperature until the first crack appears in the paint film. The attained % elongation is measured or calculated (by an incremental extensometer) on the average of three samples tested.

The humidity test is run by subjecting the painted part to 96 hour exposure at 100% relative humidity at 37.7° C. followed by a two hour immersion in hot water at 37.7° C. To pass the test there should be no evidence of blistering when examined one minute after removal from the test cabinet.

From the test results set out in Table 2, it is apparent that RIM parts made by polyurethane formulations employing tertiary amine catalyt in excess of 0.15 parts per hundred parts of polyol did not pass the standard tests designed to determine adhesion of paint to the surface thereof. By the inclusion of a small amount of a halide scavenger compound in the formulation, the obtained RIM products had improved paint adhesion properties and were able to pass the standard tests. In formulations employing only tin catalyst without tertiary amine as co-catalyst, there was no problem of residual amine in the cured polyurethane. Likewise, in the case in which reactive amine (such as DABCO-T) was employed together with a smaller amount of non-reactive tertiary amine catalyst in RIM formulations, the need for a halide scavenger in the formulation was obviated, provided that the amount of non-reactive catalyst (responsible for the unreacted amine residue) did not exceed about 0.15 parts by weight per hundred parts of polyols in the formulation. To be on the safe side, the scavenger use is recommended when the non-reactive tertiary amine in the formulation exceeds about 0.1% by weight of polyols. By the inclusion of the halogen scavenger compounds in the formulation, a tertiary amine catalyst may be utilized in the formulation, if so desired, to levels of up to about 1.0 php without adverse effect on applied acid-catalyzed high solids coatings.

In practice of the present invention when employing tertiary amine catalyst with or without a minor amount of organic tin co-catalyst, the organic halogen scavenger compound should provide the equivalent of about 1 to 1.5 molar parts of reactive halogen per mol of available amino nitrogen in the catalyst component. Depending, of course, on the molecular weight of the halogen compound and the quantity of amino catalyst in the formulation, the halogen compound may comprise 0.1 to 3 parts by weight per hundred parts of the polyol (php). The amount of polyisocyanate will of course vary with the particular polyisocyanate employed and the particular polyol(s) present but in general will be in the range of about 50 to 300 php. While tertiary amine catalyst may be employed alone, it is preferred to include a small amount of tin co-catalyst therewith, from as little as 0.02 and up to about 0.2 parts per hundred of polyol. In blown RIM products the preferred blowing agent is a fluorocarbon and generally will constitute up to about 4 pph. No blowing agent is ordinarily employed for molded solid products. The formulations ordinarily include a chain extender, such as a short chain diol in the range of 10 to 50 php.

EXAMPLES 2–10

Formulations 3A or 3B of Table 3 were used to prepare RIM products in which the halogen compound, e.g. CEF, was increased from zero to well beyond the upper limit permitted to assure maintenance of optimum physical properties. The physical properties for each of the resulting RIM products are set forth in Table 4 below.

TABLE 3

| | A | B |
|---|---|---|
| Pluracol 380 | 86.3 | 100 |
| 1,4-butanediol | 23.0 | 22.1 |
| Fluorocarbon | 1.7 | 3.5 |
| Catalyst | | |
| Triethylenediamine | 0.5–1.0 | 0.5 |
| Tin, Dibutyl Tin diLaureate | 0.04 | 0.02 |
| CEF | As shown in Table 4 | |
| Mondur CD | 80.5 | 79.5 |

TABLE 4

| EXAMPLE | 2 | 3 | 4 | 5 | 6 | 7 | 8 | 9 | 10 |
|---|---|---|---|---|---|---|---|---|---|
| FORMULATION | 3A | 3A | 3A | 3A | 3A | 3A | 3B | 3B | 3B |
| TEDA | 1.0 | 1.0 | 1.0 | 1.0 | 0.75 | 0.5 | 0.5 | 0.5 | 0.5 |

TABLE 4-continued

| EXAMPLE | 2 | 3 | 4 | 5 | 6 | 7 | 8 | 9 | 10 |
|---|---|---|---|---|---|---|---|---|---|
| CEF | 0.0 | 1.5 | 1.0 | 0.5 | 1.5 | 1.5 | 0.0 | 2.5 | 5.0 |
| DENSITY, LBS./CU. FT. | 60.1 | 59.5 | 55.4 | 55.0 | 58.1 | 58.8 | 67.0 | 63.8 | 63.0 |
| SHORE D HARDNESS | 49.5 | 48.0 | 54.0 | 52.0 | 48 | 52.0 | 49.0 | 46.0 | 43.0 |
| TEAR, LBS. - FORCE | — | — | — | — | — | — | 272 | 226.3 | 200.3 |
| TEAR, LBS. - % ELONGATION | 100 | 103.6 | 104.5 | 102.8 | 111.0 | 113.2 | 153 | 68 | 73 |
| 100% MODULUS | 2292 | 2090 | 2080 | 2206 | 2106 | 2083 | 2000 | 1088 | 1060 |
| TENSILE, PSI | 2332 | 2272 | 2310 | 2303 | 2351 | 2367 | 2253 | 1046 | 1018 |
| FLEXURAL MODULUS | | | | | | | | | |
| −20° F. | 47.5 | 52.0 | 67.0 | 56.3 | 64.7 | 65.0 | 46.0 | 45.0 | 41.8 |
| 72° F. | 23.0 | 24.0 | 35.7 | 30.0 | 29.3 | 33.7 | 20.0 | 19.2 | 17.2 |
| 158° F. | 9.5 | 9.0 | 18.7 | 12.0 | 12.8 | 14.8 | 8.2 | 9.0 | 8.0 |
| MODULUS RATIO | | | | | | | | | |
| −20°/158° | 5.0 | 5.8 | 3.4 | 4.7 | 5.1 | 4.4 | 5.6 | 5.0 | 5.2 |

From the data set forth in Table 4, it is clear that as the CEF levels in the formulation were increased to 2.5 php and above, the shore D hardness, tear strength, elongation, modulus, tensile and flexural modulus strengths were all markedly reduced. Therefore, it has been established that as the CEF level is increased to approach levels necessary to impart significant flame retardant properties, the RIM products have significantly inferior physical properties from the products obtained from the method of the present invention.

What is claimed is:

1. An elastomeric composition for the production of RIM polyurethane products comprising per hundred parts of polyether polyol therein:
   10 to 50 parts of a diol chain extender;
   50 to 300 parts polyisocyanate;
   0 to 4 parts of volatile fluorocarbon blowing agent,
   0.1 to 1.0 parts of tertiary amine catalyst; and 0 to 0.2 parts of organo tin catalyst; together with 0.1 to 3 parts of a reactive organic halogen compound.

2. An elastomeric composition as defined in claim 1 wherein said tertiary amine catalyst is a ditertiary amine.

3. An elastomeric composition as defined in claim 1 wherein said tertiary amine is triethylenediamine.

4. An elastomeric composition as defined in claim 1 containing 0.1 to 1.0 parts of triethylenediamine and 0.01 to 0.04 parts of organo-tin catalyst.

5. An elastomeric composition as defined in claim 1 or 3 wherein said organic halogen compound is a chlorophosphate.

6. An elastomeric composition as defined in claim 1 or 3 wherein said organic halogen compound is tris(chloroethyl)phosphate.

* * * * *